(12) United States Patent
Di Giusto et al.

(10) Patent No.: US 8,801,104 B2
(45) Date of Patent: *Aug. 12, 2014

(54) SEAT PORTION OF A VEHICLE SEAT

(75) Inventors: Nevio Di Giusto, Orbassano (IT);
Andrea Zussino, Orbassano (IT);
Giorgio Masoero, Orbassano (IT);
Salvatore Demontis, Orbassano (IT)

(73) Assignee: C.R.F. Societá Consortile per Azioni (IT)

( * ) Notice: Subject to any disclaimer, the term of this patent is extended or adjusted under 35 U.S.C. 154(b) by 448 days.

This patent is subject to a terminal disclaimer.

(21) Appl. No.: 13/127,000

(22) PCT Filed: Oct. 29, 2009

(86) PCT No.: PCT/EP2009/064262
§ 371 (c)(1),
(2), (4) Date: Aug. 26, 2011

(87) PCT Pub. No.: WO2010/049476
PCT Pub. Date: May 6, 2010

(65) Prior Publication Data
US 2012/0013165 A1    Jan. 19, 2012

(30) Foreign Application Priority Data
Oct. 31, 2008 (EP) .................................... 08425702

(51) Int. Cl.
*A47C 7/14* (2006.01)
*A47C 7/18* (2006.01)
*A47C 4/54* (2006.01)

(52) U.S. Cl.
USPC .............. 297/452.41; 297/284.6; 297/452.48; 297/452.55; 297/DIG. 3

(58) Field of Classification Search
USPC ............... 297/284.6, 452.41, 452.48, 452.55, 297/DIG. 3
See application file for complete search history.

(56) References Cited

U.S. PATENT DOCUMENTS 4,370,769 A * 2/1983 Herzig et al. ........ 297/452.41 X
4,497,517 A * 2/1985 Gmeiner et al. ........... 297/284.6
(Continued)

FOREIGN PATENT DOCUMENTS

DE      2136947 A1    2/1973
DE      29805926 U1   7/1999

OTHER PUBLICATIONS

"International Serial No. PCT/EP2009/064262, International Search Report mailed Jan. 29, 2010", 3 pgs.

(Continued)

*Primary Examiner* — Rodney B White
(74) *Attorney, Agent, or Firm* — Schwegman Lundberg & Woessner, P.A.

(57) ABSTRACT

A seat portion of a vehicle seat has a padding, which is covered with permeable upholstery defining a user supporting surface and has a plurality of chambers extending crosswise to the supporting surface; the chambers are open at their ends and, in use, vary in volume in response to oscillating movement of the user; the chambers are grouped in at least four groups, which are located, respectively, in front right, front left, rear right, and rear left position; the chambers of each group are isolated in fluidtight manner by the chambers of the other groups and communicate with a respective opening, which connects the lower end of the chambers to the outside; the opening of each group is associated with a respective valve, which operates independently from the valves of the other groups and is opened/closed automatically in response to compression and decompression of the air in the chambers.

20 Claims, 5 Drawing Sheets

(56) References Cited

U.S. PATENT DOCUMENTS

| | | | |
|---|---|---|---|
| 4,655,505 A * | 4/1987 | Kashiwamura et al. | ... 297/284.6 |
| 5,052,068 A * | 10/1991 | Graebe | 297/452.41 X |
| 5,369,828 A * | 12/1994 | Graebe | 297/452.41 X |
| 5,444,881 A * | 8/1995 | Landi et al. | 297/452.41 X |
| 5,556,169 A * | 9/1996 | Parrish et al. | 297/452.41 X |
| 5,570,716 A * | 11/1996 | Kamen et al. | 297/284.6 X |
| 5,617,595 A * | 4/1997 | Landi et al. | 297/452.41 X |
| 5,657,499 A * | 8/1997 | Vaughn et al. | 297/284.6 X |
| 5,658,050 A * | 8/1997 | Lorbiecki | 297/452.41 |
| 5,689,845 A * | 11/1997 | Sobieralski | 297/452.41 X |
| 5,788,332 A * | 8/1998 | Hettinga | 297/452.55 |
| 5,797,155 A * | 8/1998 | Maier et al. | 297/284.6 X |
| 5,845,352 A * | 12/1998 | Matsler et al. | 297/452.41 X |
| 6,203,105 B1 * | 3/2001 | Rhodes, Jr. | 297/284.6 |
| 6,546,578 B1 * | 4/2003 | Steinmeier | 297/452.46 X |
| 6,682,059 B1 * | 1/2004 | Daniels et al. | 297/284.6 X |
| 6,851,755 B2 * | 2/2005 | Dinkel et al. | 297/452.41 X |
| 7,156,467 B2 * | 1/2007 | Kimmig | 297/452.41 |
| 7,370,379 B2 * | 5/2008 | Zheng | 297/452.41 X |
| 8,132,859 B2 * | 3/2012 | Kramer | 297/452.41 X |
| 8,157,235 B2 * | 4/2012 | Quertelet et al. | 248/339 |
| 2003/0038517 A1 * | 2/2003 | Moran et al. | 297/284.6 X |
| 2010/0176633 A1 * | 7/2010 | Brncick et al. | 297/452.55 X |
| 2010/0314929 A1 * | 12/2010 | Hsu | 297/452.48 |
| 2011/0241404 A1 * | 10/2011 | Di Giusto et al. | 297/452.46 |

OTHER PUBLICATIONS

"International Serial No. PCT/EP2009/064262, Written Opinion mailed Jan. 29, 2010", 4 pgs.

"International Application Serial No. PCT/EP2009/062478, International Search Report mailed Dec. 4, 2009", 3 pgs.

"International Application Serial No. PCT/EP2009/062478, Written Opinion mailed Dec. 4, 2009", 4 pgs.

"U.S. Appl. No. 13/126,988, Non Final Office Action mailed Jul. 18, 2013", 15 pgs.

"U.S. Appl. No. 13/126,988, Response filed May 20, 2013 to Restriction Requirement mailed Mar. 26, 2013", 7 pgs.

"U.S. Appl. No. 13/126,988, Response filed Oct. 16, 2013 to Non Final Office Action mailed Jul. 18, 2013", 8 pgs.

"U.S. Appl. No. 13/126,988, Restriction Requirement mailed Mar. 26, 2013", 8 pgs.

"U.S. Appl. No. 13/126,988, Final Office Action mailed Dec. 18, 2013", 13 pgs.

U.S. Appl. No. 13/126,988, Examiner Interview Summary mailed Mar. 21, 2014, 3 pgs U.S. Appl. No. 13/126,988, Notice of Allowance mailed Apr. 30, 2014, 5 pgs.

U.S. Appl. No. 13/126,988, Response filed Mar. 18, 2014 to Final Office Action mailed Dec. 18, 2013, 9 pgs.

* cited by examiner

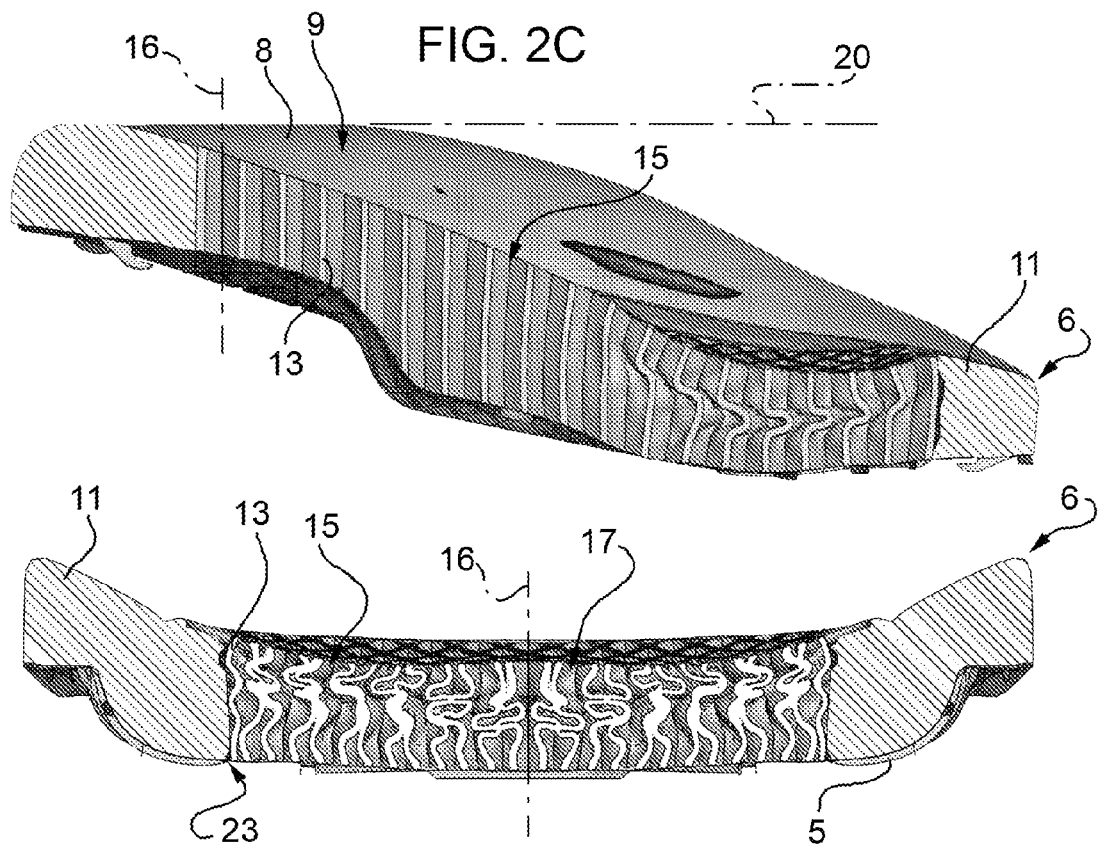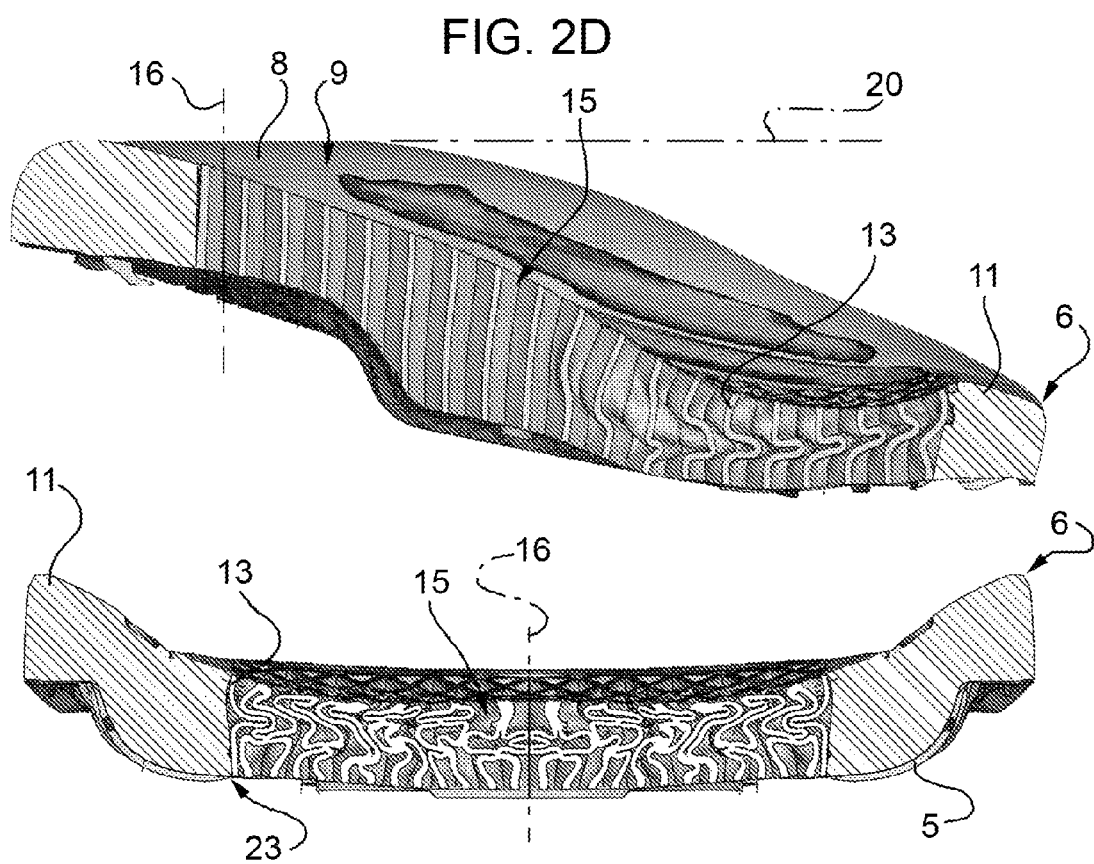

SEAT PORTION OF A VEHICLE SEAT

PRIORITY CLAIM AND RELATED APPLICATIONS

This application is a nationalization under 35 U.S.C. 371 of PCT/EP2009/064262, filed Oct. 29, 2009 and published as WO 2010/049476 A1 on May 6, 2010, which claimed priority under 35 U.S.C. 119 to European Patent Office Application No. 08425702.1, filed Oct. 31, 2008; which applications and publication are incorporated herein by reference in their entirety.

TECHNICAL FIELD

The present invention relates to a seat portion of a vehicle seat.

BACKGROUND

For maximum user comfort in terms of cooling the areas where the user's body contacts the seat, active cooling systems are used, i.e. systems comprising a fan underneath the seat portion to blow air from the vehicle interior into the seat portion or in the opposite direction to increase heat exchange and so withdraw heat.

Known active systems are unsatisfactory on account of the not always positive sensation experienced by the user.

That is, on first sitting down on the seat, the user tends to experience discomfort, which is directly proportional to the initial degree of heat exchange between the user's body and the seat. Because of the sudden withdrawal of a large amount of heat by the fan, the user experiences a chilling feeling when sitting down on the seat, especially if accompanied by severe perspiration.

To eliminate this drawback and so reduce initial heat exchange, a "passive" solution, i.e. with no fan, is preferable, and in which the initial user-seat sensation is substantially determined by the characteristics of the seat upholstery.

In this connection, DE2136947A1 describes a seat portion with spaced tubular bodies embedded in the padding. The tubular bodies are made of flexible material and define respective chambers, which communicate with the outside at the top end through upholstery permeable to air, and at the bottom end through respective flap valves fitted to a bottom wall; and the tubular bodies are surrounded by respective coil springs also embedded in the padding.

When the vehicle is moving, the valves are opened and closed cyclically by the weight of the user sitting on the seat, and by vibration from the road. That is, vibration causes a vertical up-down movement of the user, in which downward movement presses on the padding and deforms the tubular bodies and the springs, thus compressing the air in the chambers, and upward movement reduces the pressure and allows the tubular bodies and springs to expand, thus reducing the pressure inside the chambers. During compression, the valves close, and the air in the chambers flows out through the upholstery; and, during decompression, the valves open, and more air is sucked into the chambers from underneath through the valves.

In other words, normal use of the seat portion as the vehicle is moving produces an automatic or natural pumping effect to circulate air through the seat portion and so cool the areas where the user's body contacts the seat portion.

Though effective operationwise, the above solution has the drawback of comprising a large number of parts.

In order to reduce the number of parts, it is theoretically possible to provide a single valve for all the chambers, by putting the bottom ends of the chambers in communication with each other. However, in this case, if the average of air compression and air decompression in the ensemble of the chambers is constant, the valve does not open and, therefore, there is not air recirculation.

OVERVIEW

Some of the examples discussed herein provide a seat portion of a vehicle seat designed to eliminate the above drawbacks without impairing the other characteristics of the seat (comfort, durability, accident safety, etc.).

According to some examples, there is provided a seat portion of a vehicle seat, as defined in claim 1.

BRIEF DESCRIPTION OF THE DRAWINGS

A non-limiting embodiment of the present invention will be described by way of example with reference to the accompanying drawings, in which:

FIGS. 2B-2D are similar to FIG. 2A, and show performance of the seat portion as the vehicle is moving;

DETAILED DESCRIPTION

Figure 1:
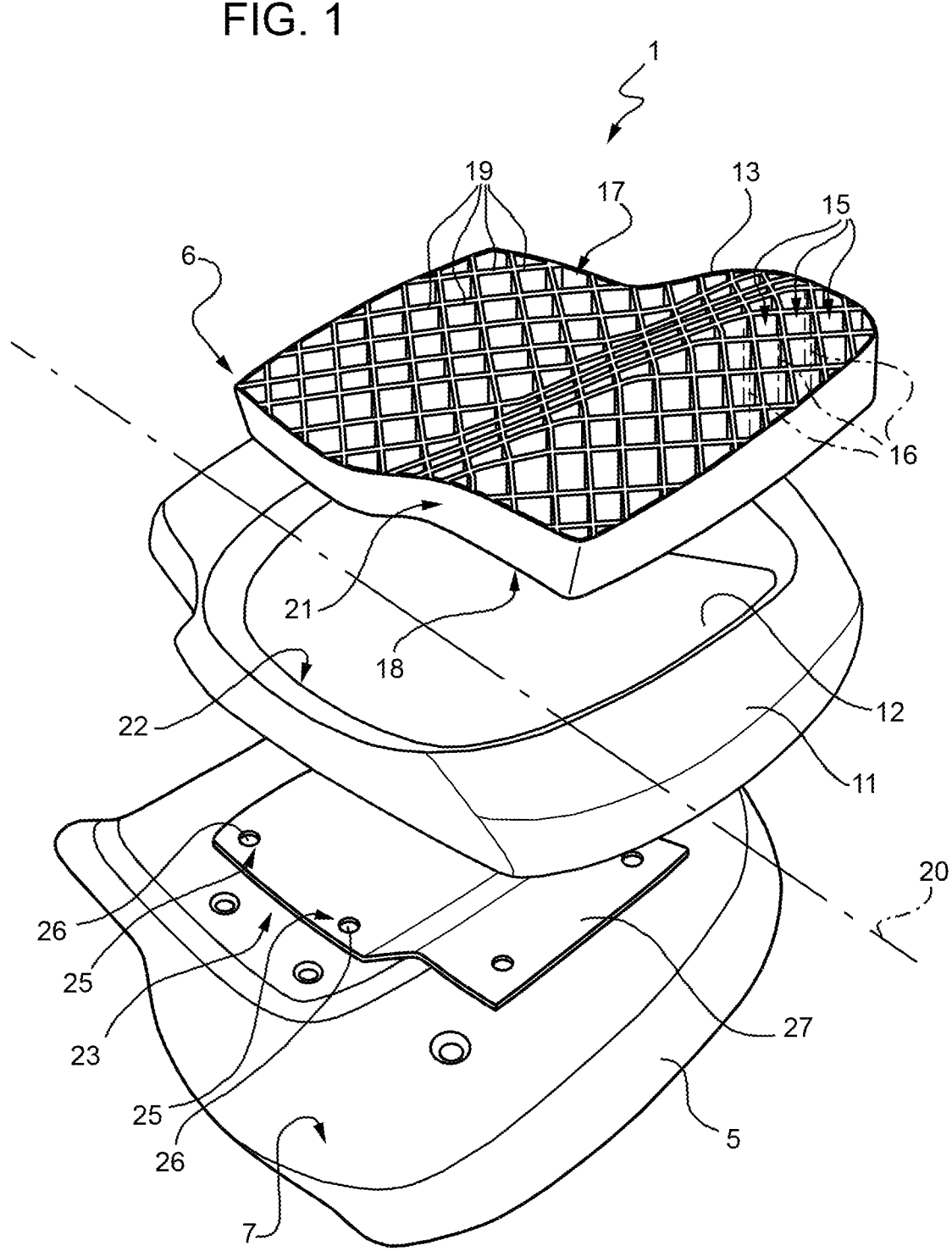
FIG. 1 shows an exploded view in perspective, with parts removed for clarity, of a seat portion of a vehicle seat.

Number 1 in FIG. 1 indicates as a whole a seat portion of a vehicle seat (partially shown).

Seat portion 1 comprises a bottom plate 5 fitted to a seat-adjusting device (not shown) and so defining an interior fixed support once the seat-adjusting device is adjusted. Alternatively, bottom plate 5 is replaced with a different type of fixed support or by a springed support.

Seat portion 1 comprises padding 6 fitted to a top face 7 of bottom plate 5; and upholstery 8 (not shown in FIG. 1) defining a top, outer, user supporting surface 9 and facing padding 6 on the underside. In the example described, upholstery 8 comprises a layer of fabric upholstery laid on top of padding 6 and fixed to the edges of bottom plate 5 in a manner not described in detail. In alternative embodiments not shown, upholstery 8 may comprise a number of layers.

Padding 6 comprises one or more peripheral bodies 11 of foam material, i.e. located along at least some of the edges of seat portion 1 to form an intermediate recess 12. More specifically, body 11 is made of polyurethane foam.

With reference to FIGS. 1 and 2, padding 6 also comprises a honeycomb body 13 housed inside recess 12. Here and hereinafter, the term "honeycomb" is intended in the sense of body 13 comprising a succession of cells 15 defined by a module or cell repeated identically over the whole of body 13.

Body 13 is formed in one piece in known manner, e.g. injection-molded or extruded and cut.

Cells 15 extend along respective axes 16 parallel to one another and crosswise to surface 9, i.e. parallel to the direction in which seat portion 1 is pressed by the user, and are open at their axial ends at a top face 17 and bottom face 18 of body 13.

Cells 15 are separated by straight walls 19 of constant thickness to define cells of constant cross section along axes 16. A square cross section is particularly advantageous to maximize the volume of cells 15 with respect to walls 19, though the cross section may be other than square.

Depending on the design shape of padding 6, the distance between faces 17 and 18 varies along a horizontal axis 20 parallel to the longitudinal travelling direction of the vehicle.

Body 13 has a lateral surface 21 which is impermeable to air and rests on the inner surface 22 of recess 12. Surfaces 21, 22 are perfectly complementary in both height and shape (e.g. recess 12 is rectangular) so body 13 fits snugly inside recess 12 to form a seamless join between bodies 11 and 13 on the top surface of padding 6. More specifically, upholstery 8 holds body 13 inside recess 12.

With reference to FIGS. 2A-2D, body 13 is located in the supporting areas subjected to most pressure and heating by contact between the user and surface 9.

Body 13 is made of a thermoplastic elastomer, e.g. a thermoplastic elastomer in the silicone family or TPS-SEBS family.

Figure 2A:
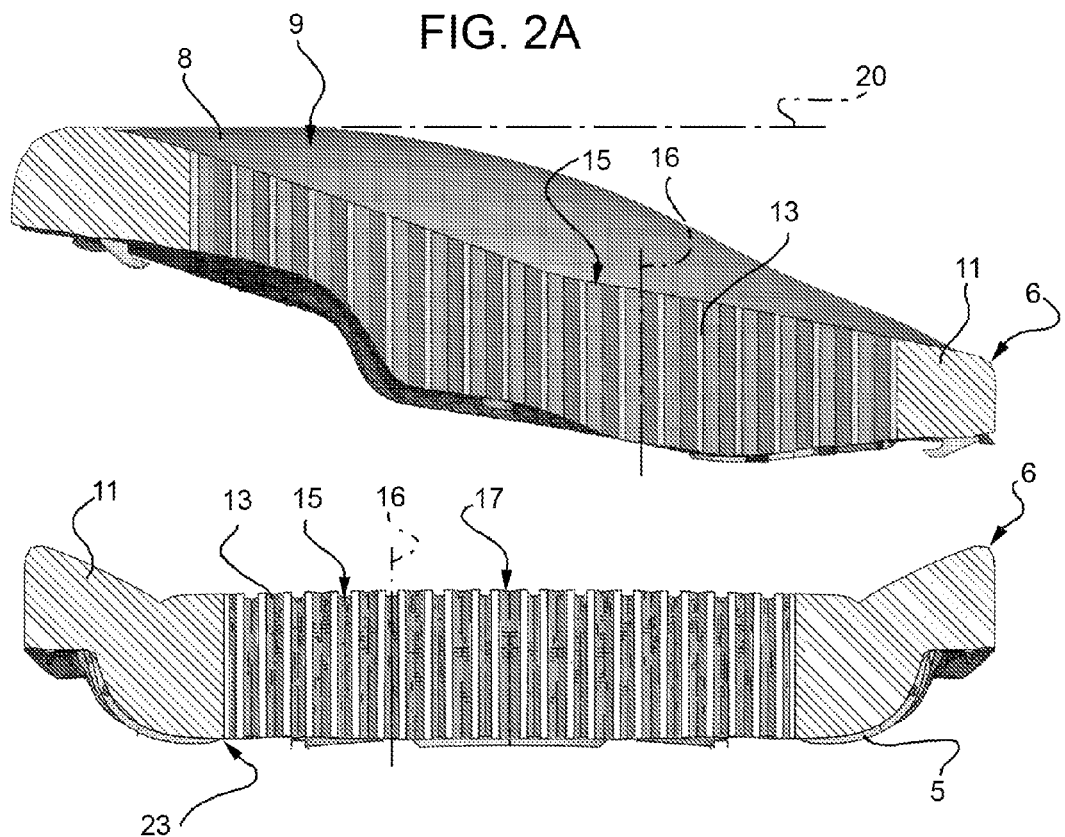
FIG. 2A shows a longitudinal section and cross section, with parts removed for clarity, of the FIG. 1 seat portion.
Figure 2B:
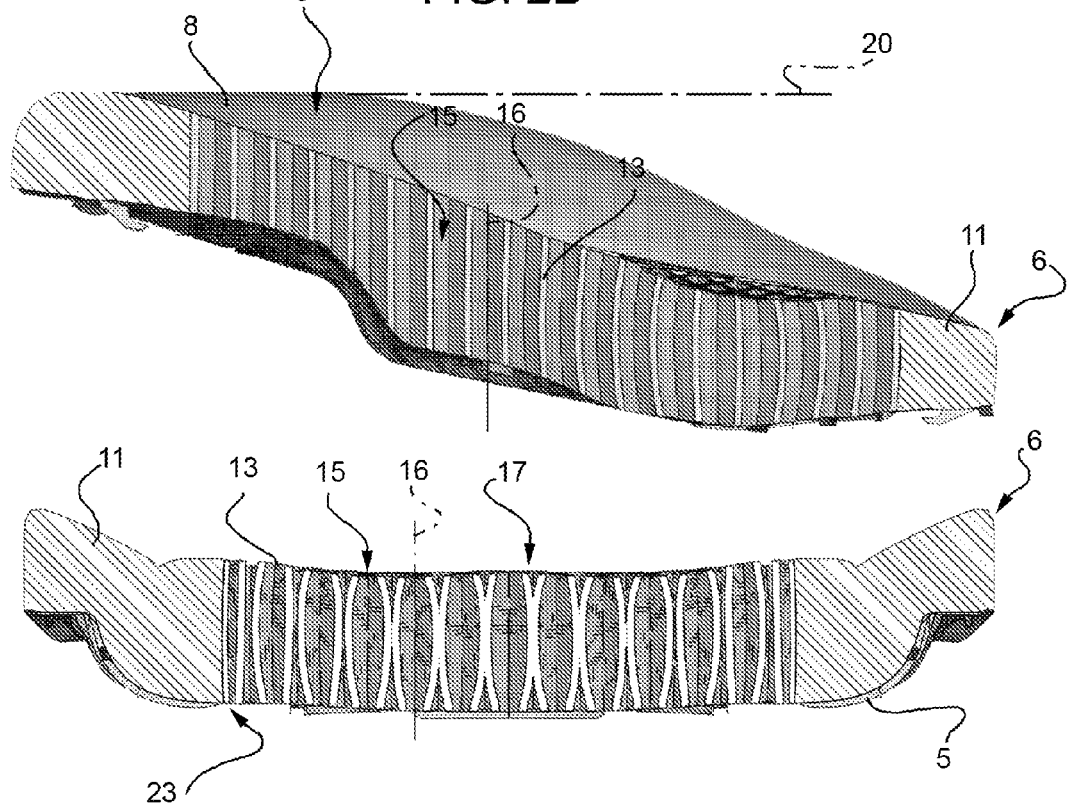

Given the flexibility of walls 19, the air volumes in cells 15 vary when padding 6 is compressed by the user's weight in response to normal oscillation of the user as the vehicle is moving. More specifically, FIG. 2A shows a rest condition, in which surface 9 is not subjected to the user's weight; and FIGS. 2B-2D show different successive degrees of compression of padding 6 as the vehicle is moving.

Upholstery 8 is permeable to air, at least when the user is seated on surface 9, and directly contacts face 17, so the top openings of cells 15 communicate with the outside through pores or passages (not shown) in upholstery 8.

Bottom plate 5 has one or more openings 23 defining respective outlets which communicate with the bottom openings of cells 15 in a manner not shown, e.g. by a network of channels beneath face 18.

Each opening 23 has a respective valve 25, e.g. a flap valve, designed to open/close opening 23 automatically in response to compression or decompression of the air in cells 15.

Cells 15 define respective chambers in which air is compressed and aspirated cyclically in response to oscillating compression of padding 6 when the vehicle is moving. During compression, valves 25 open, and the air in cells 15 flows out downwards from openings 23; and during decompression, valves 25 close, and more air is drawn down into cells 15 through upholstery 8. In other words, when the user is seated on the seat and the vehicle is moving, cells 15 and valves 25 produce an automatic or natural pumping effect which circulates air through seat portion 1 and so draws heat from surface 9.

The elasticity of the thermoplastic elastomer of which body 13 is made, the size of walls 19, and the undeformed cross section of cells 15 are designed to achieve effective "pumping" without compromising the comfort of the seat. For a honeycomb structure such as the one illustrated and described above for body 13 of a seat portion, the thickness of walls 19 ranges between 1.5 and 3 mm, and is conveniently 2.5 mm; the cross section of each cell 15 ranges between 100 and 200 mm$^2$, and is conveniently 156.25 mm$^2$; and elasticity ranges between 0.1 MPa and 0.2 MPa and conveniently between 0.14 and 0.16 MPa.

With reference to FIG. 1, the flaps of valves 25 are defined by portions 26 of a sheet 27 made of flexible material impermeable to air, e.g. silicone, and fitted to bottom plate 5. Alternatively, the flaps of valves 25 form part of bottom plate itself. Openings 23 are four in number (only two of which are shown in FIG. 1).

Figure 3:
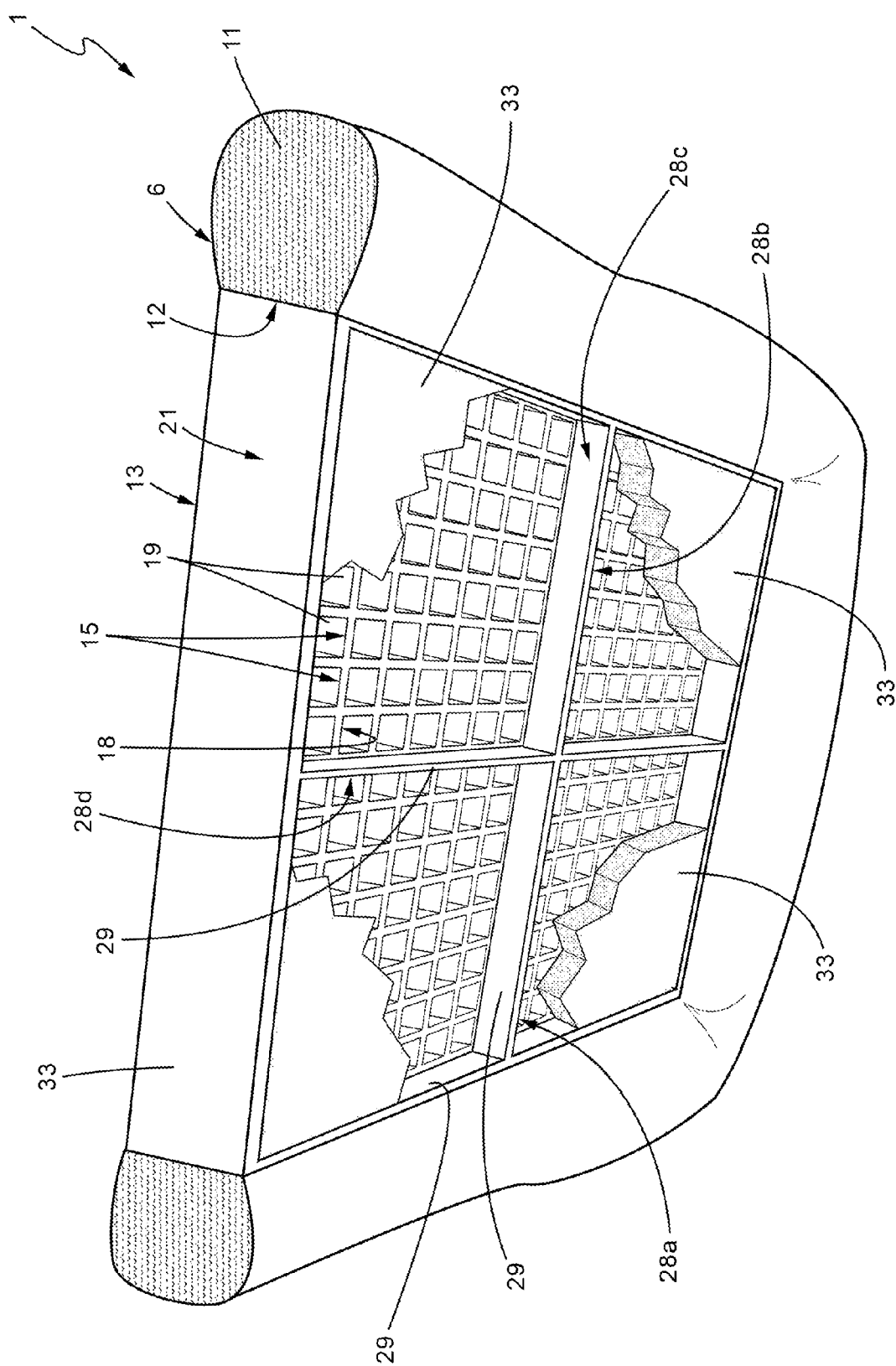
FIG. 3 shows an underside view in perspective, with parts removed for clarity, of a embodiment of the seat portion of a vehicle seat according to some examples.

As shown in the FIG. 3 embodiment according to the present invention, seat portion 1 comprises four cavities 28 underneath face 18, and each cavity 28 is associated with at least one opening 23 and a respective valve 25 (not shown in FIG. 3).

Cavities 28 in particular are defined laterally by walls 29 impermeable to air. At least some of walls 29 are formed in one piece with body 13, and define downward extensions of some of walls 19.

In alternative embodiments not shown, at least some of walls 29 form part of bottom plate 5, or are separate from body 13 and bottom plate and fixed to body 13 or bottom plate 5.

Cavities 28 define a front left manifold 28a, a front right manifold 28b, a rear right manifold 28c, and a rear left manifold 28d, which are isolated from one another in fluidtight manner, and connect respective openings 23 to respective groups of cells 15. The four groups of cells are also isolated in fluidtight manner. Obviously, the valves of each group of chambers 15 operates independently from the valves of the other groups. Therefore, four independent airflows are produced.

Dividing the cells into four groups to produce four independent airflows provides for also exploiting differences in user pressure on surface 9 in response to pitching and rolling of the vehicle (motion of the vehicle about its transverse and longitudinal axis respectively) to circulate air between cavities 28 and surface 9. For example, when accelerating and/or braking the vehicle, the user is rocked forward and/or backward, and tends to exert different pressure on the front and rear of surface 9: the two groups of cells 15 of the front right and left cavities (28b, 28a) are compressed differently from the two groups of cells 15 of the rear right and left cavities (28c, 28d), so air is recirculated, even though compression of body 13 on average is constant. The same also applies to lateral acceleration when cornering.

Cavities 28 are fitted with respective supports 33 (shown partly) which on one side rest on sheet 27 or face 7, support face 18 on the other side, are porous enough to produce negligible resistance to airflow between cells 15 and openings 23, and are made of fabric, e.g. a Muller Textile GmbH fabric known by the trade name "3mesh".

Each cavity may obviously communicate externally through more than one opening 23. Each of cavities 28c, 28d has at least two openings 23, in that the rear of the seat portion supports most of the user's weight and so tends to produce a greater airflow.

Figure 4:
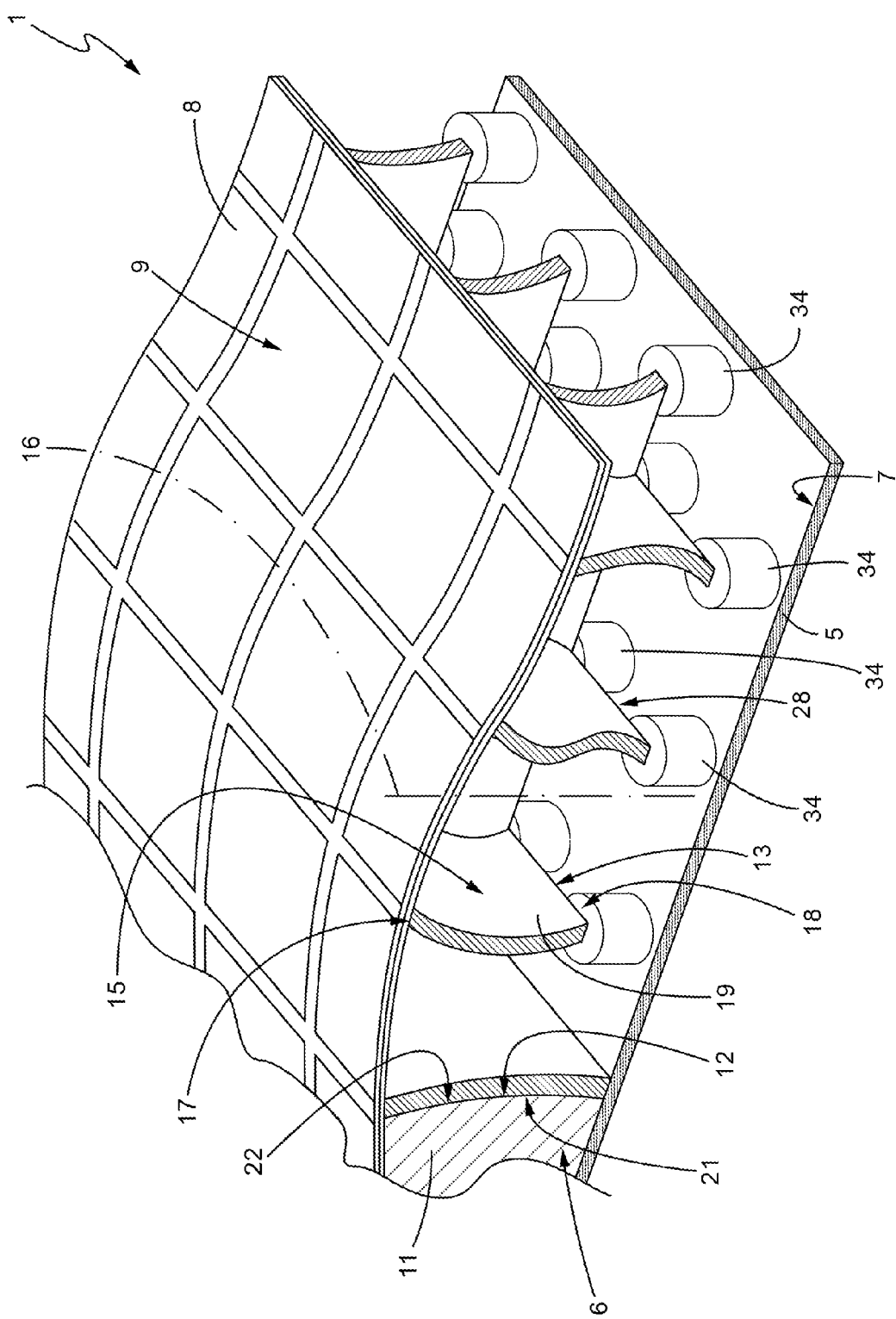
FIG. 4 shows a larger-scale view, from a different perspective, of a variation of the FIG. 3 seat portion, according to some examples.

The FIG. 4 variation shows an alternative to fabric supports 33: cavities 28 house a number of spacers 34 which rest at the bottom on sheet 27 or face 7, and support walls 19 at the top. Spacers 34 are relatively small, i.e. small enough to allow air to flow between them inside cavity 28, and are formed in one piece with body 13. Alternatively, spacers 34 may be formed in one piece with bottom plate 5, or be separate parts.

In a variation not shown, padding 6 comprises a base of foam material, which is formed in one piece with body 11, rest on face 7 of bottom plate 5 or on sheet 27, supports face 18 of body 13, has substantially vertical through holes aligned with respective openings 23, and has on its top face a network of channels defining a manifold or network connecting the substantially vertical holes in the base to the bottom openings of cells 15.

In another variation not shown, padding 6 comprises two or more honeycomb bodies one on top of another, with respective cells communicating with one another and aligned along respective axes 16.

As stated above, dividing the cells or chambers into at least four groups also exploits the rocking movement of the user caused by lateral and longitudinal inertial forces, to obtain air recirculation even when the average of compression and decompression in the ensemble of the chambers 15 is constant. Moreover, a low number of valves 25 is necessary to obtain the pumping effect, with respect to the prior art shown in DE2136947A1.

Clearly, changes may be made to seat portion 1 as described and illustrated herein without, however, departing from the scope of the present invention, as defined in the accompanying Claims.

The chambers 15 may be made in an elastic padding which is made differently from the honeycomb body 13 and preferably is still designed to avoid additional elastic elements embedded in the padding; and/or each group of chambers may be made in a respective elastic body, which is distinct from the elastic bodies of the other groups and is located side by side with the bodies of the other groups.

Upholstery 8 may also be provided with valves, together with valves 25 provided at the bottom ends of the chambers 15 underneath body 13; and/or valves 25 may circulate air in the opposite direction to that described, provided airflow is one-way.

The cells or chambers 15 may differ in shape and/or size from those described; and/or body 11 may be placed on only some of the sides of seat portion 1, or may be eliminated, and padding 6 may be defined entirely by one or more honeycomb bodies.

The invention claimed is:

1. A seat portion of a vehicle seat comprising:
   padding;
   upholstery over at least part of said padding, defining a user supporting surface, and permeable to air at least when the user is seated;
   a number of chambers which are located inside said padding, extend along parallel axes crosswise to said supporting surface and are open at opposite axial ends;
   a plurality of openings defining respective air inlets/outlets communicating with the bottom ends of said chambers; and
   valve means for operation by compression and decompression of the air in said chambers for automatically opening and closing said openings;
   the volumes of said chambers varying in response to oscillating movements of the user, so that the air in the chambers is compressed and aspirated cyclically to produce a natural pumping effect which circulates air through the supporting body,
   wherein said chambers are grouped into at least four groups, which are located, respectively, in front right, front left, rear right, and rear left position;
   the chambers of each group are isolated in fluidtight manner from the chambers of the other groups;
   the chambers of each group communicate, respectively, with at least one of said openings by a respective manifold;
   the opening of each group is associated with a respective valve, which operates independently from the valves of the other groups.

2. A seat portion as claimed claim 1, wherein only four groups of chambers are provided.

3. A seat portion as claimed in claim 1 wherein said groups of chambers are made in respective bodies, which define part of said padding; each body being distinct from the bodies of the other groups and being made in one-piece of elastically deformable material; the elasticity of said material, the size of the walls defining said chambers, and the undeformed cross section of said chambers being designed to achieve said natural pumping effect without any additional elastic element.

4. A seat portion as claimed in claim 3, wherein said elastically deformable material is a thermoplastic elastomer.

5. A seat portion as claimed in claim 1, wherein all the chambers are made in a single body, which define part of said padding and is made in one-piece of elastically deformable material; the elasticity of said material, the size of the walls defining said chambers, and the undeformed cross section of said chambers being designed to achieve said natural pumping effect without any additional elastic element.

6. A seat portion as claimed in claim 1, wherein the rear right and rear left groups of chambers communicate, by means of the respective manifolds, with a respective couple of said openings.

7. A seat portion as claimed in claim 1, wherein said manifolds are defined by respective cavities filled with a porous support supporting the walls defining said chambers.

8. A seat portion as claimed in claim 1, wherein said manifolds are defined by respective cavities housing a number of spacers, which are sized to allow airflow between them inside said manifolds, and support the walls defining said chambers.

9. A seat portion as claimed in claim. 1, wherein said manifolds are defined by respective networks of channels formed on at least one base body which support the walls defining said chambers.

10. A seat portion as claimed in claim wherein said manifolds are defined by lateral walls, at least some of which are formed in one piece with the walls defining said chambers.

11. A seat portion of a vehicle seat comprising:
    padding;
    upholstery over at least part of said padding, defining a user supporting surface. and permeable to air at least when the user is seated;
    a number of chambers which are located inside said padding, extend along parallel axes crosswise to said supporting surface and are open at opposite axial ends;
    a plurality of openings defining respective air inlets/outlets communicating with the bottom ends of said chambers; and
    a valve to operate by compression and decompression of the air in said chambers to automatically open and close said openings;
    the volumes of said chambers varying in response to oscillating movements of the user, so that the air in the chambers is compressed and aspirated cyclically to produce a natural. pumping effect which circulates air through the supporting body, wherein said chambers are grouped into at least four groups, which are located, respectively, in front right, front left, rear right, and rear left position;
    the chambers of each group are isolated in fluidtight manner from the chambers of the other groups;
    the chambers of each group communicate, respectively, with at least one of said openings by a respective manifold;
    the opening of each group is associated with a respective valve, which operates independently from the valves of the other groups.

12. A seat portion as claimed claim 1, wherein only four groups of chambers are provided.

13. A seat portion as claimed in claim 11, wherein said groups of chambers are made in respective bodies, which define part of said padding; each body being distinct from the bodies of the other groups and being made in one-piece of elastically deformable material; the elasticity of said material, the size of the wails defining said chambers, and the undeformed cross section of said chambers being designed to achieve said natural pumping effect without any additional elastic element.

14. A seat portion as claimed in claim 11, wherein all the chambers are made in a single body, which define part of said padding and is made in one-piece of elastically deformable material; the elasticity of said material, the size of the walls defining said chambers, and the undeformed cross section of said chambers being designed to achieve said natural pumping effect without any additional elastic element.

15. A seat portion as claimed in claim 11, wherein said elastically deformable material is a thermoplastic elastomer.

16. A seat portion as claimed in claim 11, wherein the rear right and rear left groups of chambers communicate, by means of the respective manifolds, with a respective couple of said openings.

17. A seat portion as claimed in claim 11, wherein said manifolds are defined by respective cavities filled with a porous support supporting the wails defining said chambers.

18. A seat portion as claimed in claim 11, wherein said manifolds are defined by respective cavities housing a number of spacers, which are sized to allow airflow between them inside said manifolds, and support the walls defining said chambers.

19. A seat portion as claimed in claim 11, wherein said manifolds are defined by respective networks of channels formed on at least one base body which support the walls defining said chambers.

20. A seat portion as claimed in claim 11, wherein said manifolds are defined by lateral walls, at least some of which are formed in one piece with the walls defining said chambers.

\* \* \* \* \*